(12) United States Patent
Simske

(10) Patent No.: US 7,269,544 B2
(45) Date of Patent: Sep. 11, 2007

(54) SYSTEM AND METHOD FOR IDENTIFYING SPECIAL WORD USAGE IN A DOCUMENT

(75) Inventor: Steven J. Simske, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 903 days.

(21) Appl. No.: 10/441,993

(22) Filed: May 20, 2003

(65) Prior Publication Data

US 2004/0236566 A1    Nov. 25, 2004

(51) Int. Cl.
*G06F 17/27* (2006.01)
*G06F 17/21* (2006.01)

(52) U.S. Cl. .................. 704/4; 704/9; 704/10

(58) Field of Classification Search .......... None
See application file for complete search history.

(56) References Cited

U.S. PATENT DOCUMENTS 5,610,812 A * 3/1997 Schabes et al. ........... 704/9

FOREIGN PATENT DOCUMENTS

WO        WO00/30070        5/2000

OTHER PUBLICATIONS

Lee, et al. "Hybrid POS tagging with generalized unknown-word handling" In Proceedings of the 2nd international workshop on information retrieval with Asian languages (iral97), Tsukuba-City, Japan, pp. 43-50, 1997.*

Wu et al. "Using Multiple Taggers to Improve English Part-of-Speech Tagging by Error Learning" Qualification Project Report of the Johns Hopkins University Department of Computer Science, May 8, 1997.*

World Wide Web: http://natcorp.ox.ac.uk/what/gramtag.html; Leech, Geoffrey, "A Brief Users' Guide to the Grammatical Tagging of the British National Corpus", pp. 25.

World Wide Web: http://natcorp.ox.ac.uk/what/index.html; "What is the BNC?", pp. 2.

Brill, Eric; The Johns Hopkins University; "Transformation-Based Error-Driven Learning and Natural Language Processing: A Case Study in Part of Speech Tagging", 1995 Association for Computational Linguistics, pp. 37.

UK Search Report dated Sep. 21, 2004 (3 page).

* cited by examiner

*Primary Examiner*—V. Paul Harper

(57) ABSTRACT

A method of identifying potential novel word usage in a document comprises determining a part-of-speech assignment for each word in the document using a first part-of-speech tagger, determining a part-of-speech assignment for each word in the document using a second part-of-speech tagger different from the first part-of-speech tagger, and comparing the part-of-speech assignment of the first and second part-of-speech taggers. The method then generates a differential word set having words with different part-of-speech assignment by the first and second part-of-speech taggers. The words in the differential word set are candidates of words of novel usage.

19 Claims, 2 Drawing Sheets

SYSTEM AND METHOD FOR IDENTIFYING SPECIAL WORD USAGE IN A DOCUMENT

TECHNICAL FIELD OF THE INVENTION

The present invention relates generally to the field of computers and, in particular, to a system and method for identifying special word usage in a document.

BACKGROUND OF THE INVENTION

The Information Highway built on the Internet and the World Wide Web has brought a tsunami of electronic data to everyone's computer. The large volumes of data make it difficult to adequately process, comprehend and utilize the content of the data. As one of the first steps commonly used to process documents, part-of-speech (POS) taggers have been used to tag or label text with the grammatical or syntactical parts of speech. Because a word may have different meaning depending on the context, POS tagging significantly enhances the understanding of the text. POS tagging also enables natural language processing tasks so that data may be summarized, categorized, and otherwise applied to some function in some form.

Language is dynamic, however, and words may acquire new meaning in/for certain segments of the population. For example, certain words or their usage may evolve in certain geographical regions or cultural/racial groups. As another example, certain groups of people, such as a scientific, technical, legal or another professional community, may coin new meaning for known words, or create new words and new word combinations. Therefore, it is desirable to recognize and identify such special or novel word usage so that better text understanding may be achieved.

SUMMARY OF THE INVENTION

In accordance with an embodiment of the present invention, a method of identifying potential novel word usage in a document comprises determining a part-of-speech assignment for each word in the document using a first part-of-speech tagger, determining a part-of-speech assignment for each word in the document using a second part-of-speech tagger different from the first part-of-speech tagger, and comparing the part-of-speech assignment of the first and second part-of-speech taggers. The method generates a differential word set having words with different part-of-speech assignment by the first and second part-of-speech taggers. The words in the differential word set are candidates of words of novel usage.

In accordance with another embodiment of the invention, a computer-readable article encoded with a computer-executable process comprises assigning a first part-of-speech tag to words in a plurality of documents according to a first part-of-speech tagging method, assigning a second part-of-speech tag for words in the plurality of documents according to a second part-of-speech tagging method more simplistic than the first part-of-speech tagging method, and comparing the first and second part-of-speech tags. The process further comprises generating a differential word set having words with different first and second part-of-speech tags.

In accordance with yet another embodiment of the present invention, a system for identifying novel word usage in a document set comprises a microprocessor, and a series of computer instructions comprising a method. The method comprises assigning a first part-of speech tag to words in a plurality of documents according to a first part-of-speech tagging method, assigning a second part-of-speech tag for words in the plurality of documents according to a second part-of-speech tagging method more simplistic than the first part-of-speech tagging method, comparing the first and second part-of-speech tags, and generating a differential word set having words with different first and second part-of-speech tags.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
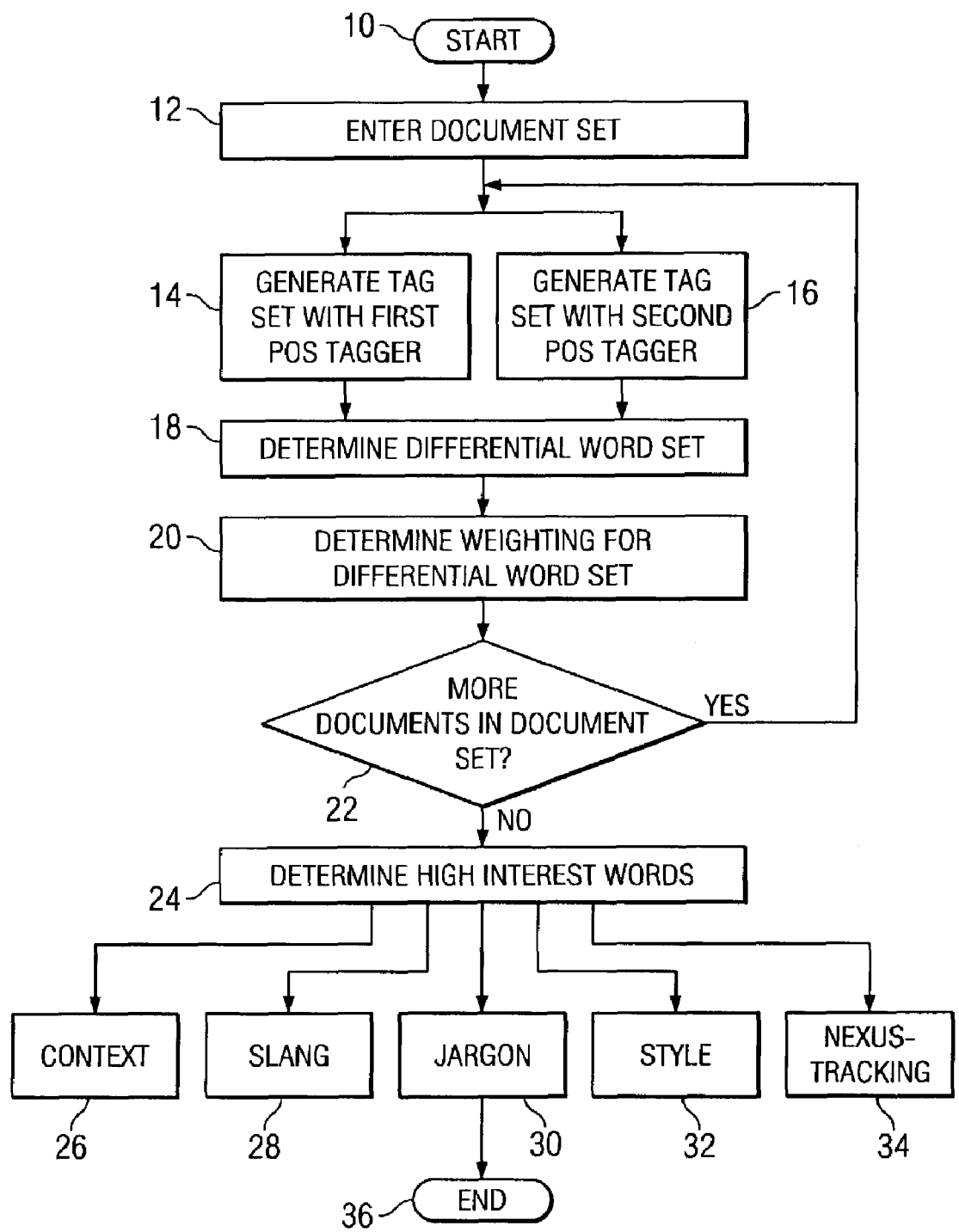
FIG. 1 is a flowchart of an embodiment of a method for identifying special word usage in a document according to the present invention.
Figure 2:
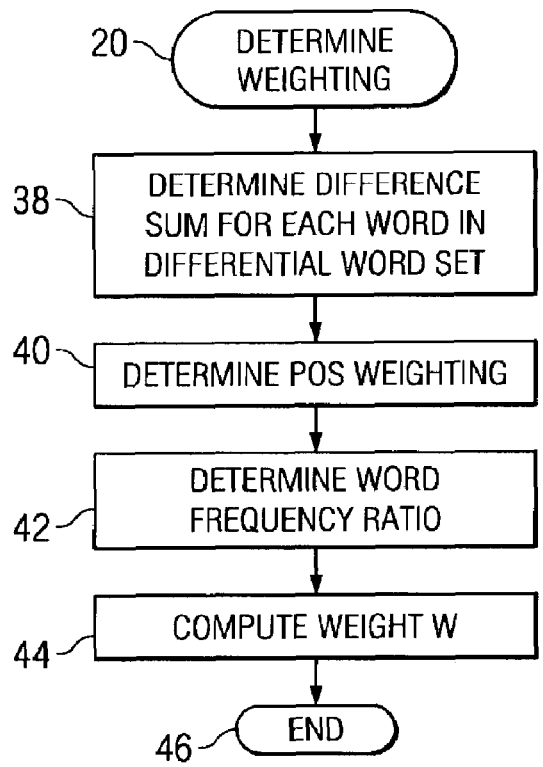
FIG. 2 is a flowchart of an embodiment of a method for determining the word weighting according to the present invention.
Figure 3:
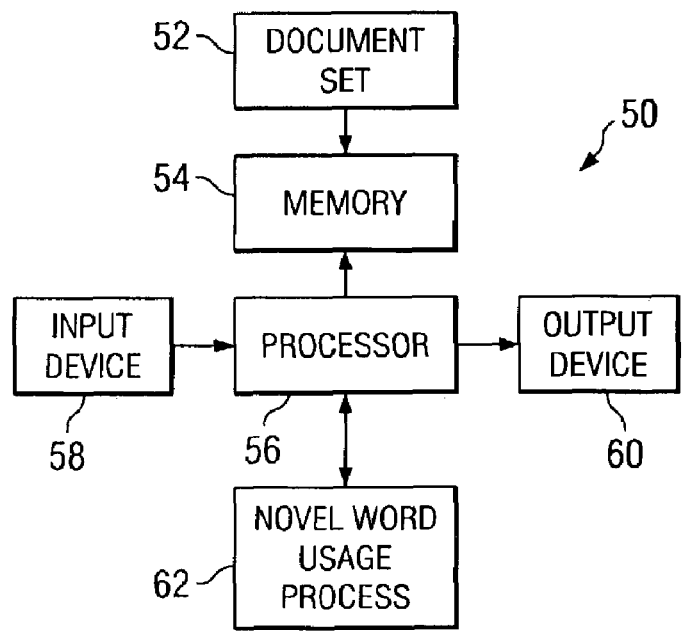
FIG. 3 is a block diagram of a system embodiment for identifying special word usage according to the present invention.

The preferred embodiment of the present invention and its advantages are best understood by referring to FIGS. 1 through 3 of the drawings, like numerals being used for like and corresponding parts of the various drawings.

FIG. 1 is a flowchart of an embodiment of a method 10 for identifying special word usage in a document according to the present invention. Method 10 may be initiated or used in a variety of ways. For example, method 10 may be automatically invoked by another computer application, such as a word processor, browser, database user interface, search engine, etc. A user may also manually initiate method 10. In block 12, the document set containing a plurality of text documents are provided as input to method 10. There may be one or more preparatory steps that need to be taken. If the document is paper-based, optical character recognition (OCR) applications may be used to scan and convert the paper-based, optical document into an electronic document. Other applications or tools may be used to separate the text from non-text portions of the document and further index or store each recognizable word in a data structure such as an array. If the document set is a website, then the input in block 12 may comprise the universal resource locator (URL) of the website. If the document set is stored in a folder or directory, then the input may comprise the path to the directory or folder. If the document set contains documents that are ordered in some manner, such as messages posted on a message board (or "blog") over time, then such sequential ordering of the documents or information related thereto are also provide as input.

In blocks 14 and 16, two different part-of-speech (POS) taggers are used to analyze each document in the document set to generate a first and second tag set for each document. The first POS tagger is a tagger such as a transformational rule-based Brill POS tagger authored by Eric Brill, or one of its variations. To increase the accuracy of the first tagger, a combination of two or more thorough and accurate POS taggers may be used. The POS tag set used in the Brill POS tagger is the University of Pennsylvania Treebank POS tagset shown in TABLE A:

TABLE A

| 1 | CC | Coordinating conjunction |
|---|---|---|
| 2 | CD | Cardinal number |
| 3 | DT | Determiner |
| 4 | EX | Existential "there" |
| 5 | FW | Foreign word |
| 6 | IN | Preposition or subordinating conjunction |
| 7 | JJ | Adjective |
| 8 | JJR | Adjective, comparative |
| 9 | JJS | Adjective, superlative |
| 10 | LS | List item marker |
| 11 | MD | Modal |
| 12 | NN | Noun, singular or mass |
| 13 | NNS | Noun, plural |
| 14 | NNP | Proper noun, singular |
| 15 | NNPS | Proper noun, plural |
| 16 | PDT | Predeterminer |
| 17 | POS | Possessive ending |
| 18 | PP | Personal pronoun |
| 19 | PPS | Possessive pronoun |
| 20 | RB | Adverb |
| 21 | RBR | Adverb, comparative |
| 22 | RBS | Adverb, superlative |
| 23 | RP | Particle |
| 24 | SYM | Symbol |
| 25 | TO | "to" |
| 26 | UH | Interjection |
| 27 | VB | Verb, base form |
| 28 | VBD | Verb, past tense |
| 29 | VBG | Verb, gerund or present participle |
| 30 | VBN | Verb, past participle |
| 31 | VBP | Verb, non-3rd person singular present |
| 32 | VBZ | Verb, 3rd person singular present |
| 33 | WDT | Wh-determiner |
| 34 | WP | Wh-pronoun |
| 35 | WPS | Possessive Wh-pronoun |
| 36 | WRB | Wh-adverb |

The tag set shown in TABLE A is a very thorough set of grammatical tags that makes distinctions between different verb and noun usages, for example.

A simple or partial tagger, such as the second tagger used in block 16 may not distinguish between the various verb forms, for example. An example of a partial POS tagger is a corpus-based tagger, which is a database or corpus of collected written and/or spoken text that has already been grammatically tagged. An example of such statistical database is the Word Frequencies in Written and Spoken English: based on the British National Corpus by Leech, Geoffrey et al. (2001). The British National Corpus (BNC) is a 100,000,000 word electronic database sampled from present-day spoken and written English. Because the tag set used by the partial POS tagger is likely to be different than that used in the full-featured POS tagger, certain tags may need to be expanded. Alternatively, a corpus that uses the same tag set as the first POS tagger may be used for the second POS tagger.

In block 18, the tagged results from the full POS tagger (block 14) and the tagged results from the partial POS tagger (block 16) are compared to determine a differential word set that contains words that have been tagged differently by the two POS taggers. For example, a sentence, "Bob might race to win" may be tagged in this manner by the two POS taggers:

| SENTENCE: | Bob | might | race | to | win |
|---|---|---|---|---|---|
| FIRST POS TAGGER | NNP | MD | VB | IN | VB |
| SECOND POS TAGGER | NNP | MD | NN | PREP | VB |

NNP represents singular proper noun, MD represents modal, VB represents base form verb, IN represents preposition or subordinating conjunction, NN represents singular or mass noun, and PREP represents preposition. It may be seen that the word "race" is tagged differently by the two POS taggers. The first or full POS tagger has correctly tagged "race" as a verb, and the second or partial POS tagger has incorrectly tagged "race" as a noun. The word "race" will thus be included in the differential word set. Therefore, the process generates a differential word set or signature for each document in the document set of interest. A signature is an ordered vector highlighting the POS differences between the full tagger and the partial or corpus-based tagger. For example, the following may be a signature expressed in XML (extensible markup language) for a corpus in which new slang terms are being used:

```
<TaggerDifferences>
    <Term>
        <Spelling>swing</Spelling>
        <Weight>34.44</Weight>
    </Term>
    ...
    <Term>
        <Spelling>hoop</Spelling>
        <Weight>3.67</Weight>
    </Term>
</TaggerDifferences>
```

In block 20, a weighting is determined for each word in the differential word set of each document. In general, how a word is used in an entire document set is of interest. For example, if in a document set we find a particular word, "race," is used as a verb 56.7% of the time and as a noun 43.3% of the time. These percentages are significantly different from the established 6.3% verb and 93.7% noun usage statistics. Referring also to block 38 in FIG. 2, a difference sum, $S_d$, for a particular word in the differential word set can be computed from:

$$S_d = \Sigma_{i \in POS\ tag\ set}(|\%(\text{full POS tagger}) - \%(\text{partial POS tagger})|)$$

Thus for the word, "race," its difference sum would be:

$$S_d = |56.7 - 6.4| + |43.3 - 93.7| = 100.8$$

In general, the value for the difference sum, $S_d$, will range from 0 to 200. Therefore, the difference sum reflects the present usage deviation from the established or expected POS usage of the word.

In block 40, a weighting based on the parts of speech of each word is determined. For example, words or terms that are nouns and verbs are typically of interest or more important than prepositions. As such, words used as nouns may receive a higher weighting than words used as prepositions. Therefore, the POS tagging by the full tagger is used as the basis to determine a POS-based weighting, $W_{POS(full\ tagger)}$. There are various different ways to determine the relative weighting, such as modified steepest descent, principal component analysis, support vector machines, and other suitable approaches now known and later developed.

In block 42, a word frequency ratio is determined. The word frequency ratio, FR, is a number arrived at by combining a number of variables commonly used in the field of information retrieval, including term frequency, TF, inverse document frequency, IDF, and inverse (document) length, IL. TF measures the frequency by which a word appears in a document. IDF measures the relative occurrence of the word across many documents and is typically expressed as:

$$IDF = -\log_2 df_w/D,$$

Where $df_w$ is document frequency or the number of documents that contain the word, and D is the number of documents in the document set. IL is (length of the document)$^{-1}$. The weighting, W, can be a function of the above terms:

$$W = S_d * W_{POS(full\ tagger)} * TF * IL * IDF.$$

The expression, TF*IL*IDF, can be simplified to a variable called frequency ratio, FR, or the ratio of occurrence of the term in the document set of interest compared to the tagged corpus. Frequency ratio is a concept that is also commonly used in the field of information retrieval. Therefore, with the determination of FR in block 42, a weighting, W, for the word is determined in block 44, which can be expressed by:

$$W = S_d * W_{POS(full\ tagger)} * FR.$$

The process for determining a weight for each word in the differential word set is repeated for each document and ends in block 46.

Returning to FIG. 1, the weight for each word in the differential word set of each document is determined as shown in blocks 14-20 until all documents in the document set have been processed, as determined in block 22. An exemplary output from this process represented in XML format is shown below:

```
<WeightWordSet type="DocumentSet" namespace="Test">
    <Word>
        <Spelling>race</Spelling>
        <Weight>100.8</Weight>
        <FullPOS>VB</FullPOS>
    </Word>
    <Word>
        <Spelling>shingle</Spelling>
        <Weight>134.5</Weight>
        <FullPOS>VB</FullPOS>
    </Word>
    <Word>
        <Spelling>chad</Spelling>
        <Weight>144.5</Weight>
        <FullPOS>VB</FullPOS>
    </Word>
    ...
</WeightWordSet>
```

In the above example, three words or more have been identified in the differential word set of the document set. For each word, its weight and POS tag as determined by the full POS tagger are provided.

In block 24, a subset of the words in the differential word set of the document set is selected. The selected words are of high interest and are possibly slang, code words, jargon, words indicative of style, and other terms of interest. A number of criteria may be used alone or in combination to select the high interest words from the differential word set.

For example, the selection criteria may include selecting a predetermined number of words with the highest weight, all words with weighting greater than or equal to a predetermined weight value, all words with greater than or equal to a predetermined percentage of the highest weighted words, and combinations of these and other suitable criteria. The result is a high interest word set for the document set.

In blocks 26-34, the resultant high interest word set is used in a number of exemplary applications described below to identify words used in a special manner so that documents containing these special word usages may be identified and/or classified, new trends for word usage may be identified and tracked, and better machine text understanding is possible.

In block 26, the high interest word set is used to identify documents in another document corpus that are similar in context to the document set. More specifically, the words in the high interest word set are used to cluster documents that may share similar characteristics as the document set. The "context" uncovered or indicated by the high interest word set may provide code words or words that are used in a novel manner in the document set. Because the high interest word set is derived from words that have been tagged differently by the POS taggers, the resultant words in the high interest word set are remarkably different than keywords derived by conventional or other keyword identification processes. In these processes, the keywords are typically used in their correct statistical POS distribution, not one that deviates from it. The conventional processes are especially ineffective where the documents are sequential (such as a series of electronic mail messages or follow-up messages or articles), and where the documents contain purposely obfuscated text. In these instances, the process described above and shown in FIGS. 1 and 2 is operable to identify and recognize words used in a novel manner that may be of interest.

Slang is another type of word usage that may be detected by process 10, as shown in block 28. Slang is a word that is consistently used as a different parts of speech than its normal, conventional usage. The progressive adoption of slang may be identifiable and traceable across documents in a temporal order. In addition, unknown words can be represented separately from known words used in a novel way.

Jargon is another type of special word usage that may be detected by process 10, as shown in block 30. Jargon is special terminology used in a given field. Jargon is used more formally and typically distinguished from slang, which is used in informal language. Similar to slang, jargon can be a known word used in a different way from its statistical POS usage, or an unknown word.

Using process 10, the style and/or genre of documents, as characterized by novel word usage, may be detected, as shown in block 32. Therefore, these documents may be grouped accordingly to such determination. In particular, the absolute and relative use of words in a novel manner with respect to their POS statistics may be determined. For example, the mean value of the difference sum, $S_d$, across the entire document set may be determined. The mean value of $S_d$ or $\mu(S_d)$ is high when the document set contains many novel uses of words. $\mu(S_d)$ can be weighted by word length, word novelty, and other statistics, and may be used to cluster the documents according to style and genre. Document clustering may be determined by a number of factors such as $\mu(S_d)$ and weighted $\mu(S_d)$, high interest word set, unknown words and their use, weighted high interest word set and/or weighted unknown words, and a weighted combination of one or more of the foregoing factors.

In block 34, nexus tracking refers to identifying trends in novel word usage across a corpus temporally, geographically and/or culturally. Such novel word usage trends may be indicative of document interrelationship and other associations, which may be further recognized and processed using other means such as keyword extraction, etc.

The previous applications shown in blocks 26-34 are examples provided that may benefit from the high interest word set generation process of the present invention. These high interest words may include such words as slang, code words, jargon, and words indicative of style and genre of the document. The manner in which this information may be used to improve text understanding is numerous and varied.

FIG. 3 is a block diagram of a system embodiment for identifying special word usage according to the present invention. System 50 receives a document set 52 consisting of a at least one document in electronic form and stores the document set in a memory 54. Memory 54 is coupled and accessible by a processor 56, which is further coupled to an input device 58 and an output device 60. Input device 58 comprises any device that is operable to provide input to processor 56, including devices that may be directly manipulated by users such as a keyboard and a pointing device. Output device 60 comprises any devices that is operable to provide information from processor 56 in a human-perceivable form, such as a display, printer, facsimile machine, speakers, etc. Processor 56 is operable to execute computer-readable instructions 62 encoding at least one embodiment of the methods for identifying novel word usage. As described above, the resultant word set may be used in a number of applications so that documents containing these special word usages may be identified and/or classified, new trends for word usage may be identified and tracked, and better machine text understanding is possible.

What is claimed is:

1. A method of identifying potential novel word usage in a document, comprising:
    determining a part-of-speech assignment for each word in the document using a first part-of-speech tagger;
    determining a part-of-speech assignment for each word in the document using a second part-of-speech tagger different from the first part-of-speech tagger;
    comparing the part-of-speech assignment of the first and second part-of-speech taggers;
    generating a differential word set having words with different part-of-speech assignment by the first and second part-of-speech taggers, the words in the differential word set being candidates of words of novel usage; and
    determining a weight to each word in the differential word set in response to the part-of-speech assignment of the word by the first part-of-speech tagger.

2. The method, as set forth in claim 1, wherein determining a weight to each word further comprises determining a weight in response to how frequently the word occurs in the document.

3. The method, as set forth in claim 1, wherein determining a weight to each word further comprises determining a weight in response to how frequently the word occurs in a document set comprising the document.

4. The method, as set forth in claim 1, wherein determining a weight to each word further comprises determining a weight by determining:

$$W = S_d * W_{POS(\text{first POS tagger})} * FR,$$

where $S_d$ is a difference sum that reflects the part-of-speech usage deviation from an expected part-of-speech usage of the word, $W_{POS(\text{first POS tagger})}$ is a weight based on the part-of-speech assignment for the word determined by the first part-of-speech tagger, and FR is a ratio of occurrence of the word in a document set comprising the document to a document corpus upon which the second part-of-speech tagger is based.

5. The method, as set forth in claim 1, further comprising selecting a subset of words from the differential word set in response to the weight determined for each word.

6. A method of identifying potential novel word usage in a document, comprising:
    determining a part-of-speech assignment for each word in the document using a first part-of-speech tagger;
    determining a part-of-speech assignment for each word in the document using a second part-of-speech tagger different from the first part-of-speech tagger;
    comparing the part-of-speech assignment of the first and second part-of-speech taggers;
    generating a differential word set having words with different part-of-speech assignment by the first and second part-of-speech taggers, the words in the differential word set being candidates of words of novel usage; and determining a weight to each word in the differential word set, wherein determining a weight to each word comprises determining a weight in response to a deviation from an expected part-of-speech usage of the word.

7. The method, as set forth in claim 6, further comprising determining the weight based on a frequency of use of the word in the document.

8. The method, as set forth in claim 6, further comprising determining the weight based on a frequency of use of the word in a document set comprising the document.

9. The method, as set forth in claim 6, further comprising selecting a subset of words from the differential word set in response to the weight determined for each word.

10. A computer-readable article encoded with a computer-executable process, the process comprising:
    assigning a first part-of-speech tag to words in at least one document according to a first part-of-speech tagging method;
    assigning a second part-of-speech tag for words in the at least one document according to a second part-of-speech tagging method more simplistic than the first part-of-speech tagging method;
    comparing the first and second part-of-speech tags;
    generating a differential word set having words with different first and second part-of-speech tags; and
    determining a weight to each word in the differential word set in response to the first part-of-speech tag of the word.

11. The article, as set forth in claim 10, wherein determining a weight to each word comprises determining a weight in response to a deviation from an expected part-of-speech usage of the word.

12. The article, as set forth in claim 10, wherein determining a weight to each word comprises determining a weight in response to how frequently the word occurs in the document.

13. The article, as set forth in claim 10, wherein determining a weight to each word comprises determining a weight in response to how frequently the word occurs in a document set comprising the document.

14. The article, as set forth in claim 10, wherein determining a weight to each word comprises determining a weight by determining:

$$W = S_d * W_{POS(\text{first POS tagging method})} * FR,$$

where $S_d$ is a difference sum that reflects the part-of-speech usage deviation from an expected part-of-speech usage of the word, $W_{POS(\text{first POS tagging method})}$ is a weight based on the first part-of-speech tag for the word, and FR is a ratio of occurrence of the word in a document set comprising the document to a document corpus upon which the second part-of-speech tagging method is based.

15. The article, as set forth in claim 10, further comprising selecting words of novel usage from the differential word set.

16. The article, as set forth in claim 15, wherein selecting words of novel usage comprises selecting words meeting a predetermined weight criteria.

17. A system for identifying potential novel word usage in a document set comprising:
   a microprocessor; and
   a series of computer instructions comprising a method of:
      assigning a first part-of-speech tag to words in at least one document according to a first part-of-speech tagging method;
      assigning a second part-of-speech tag for words in at least one document according to a second part-of-speech tagging method more simplistic than the first part-of-speech tagging method;
      comparing the first and second part-of-speech tags;
      generating a differential word set having words with different first and second part-of-speech tags; and
      selecting words of novel usage from the differential word set meeting a predetermined weight criteria.

18. The system, as set forth in claim 17, wherein the method further comprises determining a weight to each word in the differential word set.

19. The system, as set forth in claim 17, wherein the method further comprises determining a weight to each word by determining:

$$W = S_d * W_{POS(\text{first POS tagging method})} * FR,$$

where $S_d$ is a difference sum that reflects the part-of-speech usage deviation from an expected part-of-speech usage of the word, $W_{POS(\text{first POS tagging method})}$ is a weight based on the first part-of-speech tag for the word, and FR is a ratio of occurrence of the word in a document set comprising the document to a document corpus upon which the second part-of-speech tagging method is based.

* * * * *

UNITED STATES PATENT AND TRADEMARK OFFICE
CERTIFICATE OF CORRECTION

PATENT NO.       : 7,269,544 B2                                        Page 1 of 1
APPLICATION NO.  : 10/441993
DATED            : September 11, 2007
INVENTOR(S)      : Steven J. Simske It is certified that error appears in the above-identified patent and that said Letters Patent is hereby corrected as shown below:

In column 2, line 45, after "paper-based" delete ", optical".

Signed and Sealed this

First Day of July, 2008

JON W. DUDAS
*Director of the United States Patent and Trademark Office*